(12) United States Patent
Wendling

(10) Patent No.: US 7,721,516 B2
(45) Date of Patent: May 25, 2010

(54) HARVESTING MACHINE COMBINATION FOR THE UTILIZATION OF PLANT REMAINS

(75) Inventor: Ignatz Wendling, Zweibrücken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/360,894

(22) Filed: Jan. 28, 2009

(65) Prior Publication Data
US 2009/0193777 A1   Aug. 6, 2009

(30) Foreign Application Priority Data
Jan. 31, 2008   (DE) .................. 10 2008 006 882

(51) Int. Cl.
*A01B 69/00* (2006.01)
(52) U.S. Cl. .................. 56/10.2 A; 460/22; 701/50
(58) Field of Classification Search ............. 56/10.2 R, 56/10.2 A, 10.2 F, DIG. 15; 460/1, 22, 23, 460/114–116, 119; 701/50
See application file for complete search history.

(56) References Cited

U.S. PATENT DOCUMENTS

| | | | |
|---|---|---|---|
| 3,317,064 A | 5/1967 | Fingerut | |
| 3,669,123 A | 6/1972 | Gaeddert et al. | |
| 3,933,314 A * | 1/1976 | Luscombe | 241/60 |
| 3,952,889 A | 4/1976 | Wanker et al. | |
| 5,941,768 A * | 8/1999 | Flamme | 460/114 |
| 6,587,772 B2 * | 7/2003 | Behnke | 701/50 |
| 6,682,416 B2 * | 1/2004 | Behnke et al. | 460/114 |
| 7,537,519 B2 * | 5/2009 | Huster et al. | 460/114 |

FOREIGN PATENT DOCUMENTS

| | | |
|---|---|---|
| AU | 699834 | 5/1996 |
| DE | 1096667 | 1/1961 |
| DE | 10064860 | 6/2002 |
| DE | 10064862 | 7/2002 |
| DE | 102004039460 | 4/2006 |
| SU | 376054 | 1/1978 |

* cited by examiner

*Primary Examiner*—Alicia M Torres

(57) ABSTRACT

A harvesting machine combination for the utilization of harvested plant remains is provided and includes a combine with an outlet for harvested crop remains, a self propelled forage harvester that includes a conveyor to take over the harvested crop remains from the outlet of the combine, a discharge arrangement for the harvested crop remains, an engine for the drive of the conveyor and a container to take up the harvested crop remains delivered by the discharge arrangement. The combine is equipped with a transmitting arrangement for the transmission of position data and/or operation direction and speed data of the combine. The forage harvester is equipped with a receiving arrangement that interacts with an automatic steering and speed input arrangement of the forage harvester that can be operated on the basis of the data received by the receiving arrangement in order to permit the forage harvester to follow the combine automatically.

1 Claim, 1 Drawing Sheet

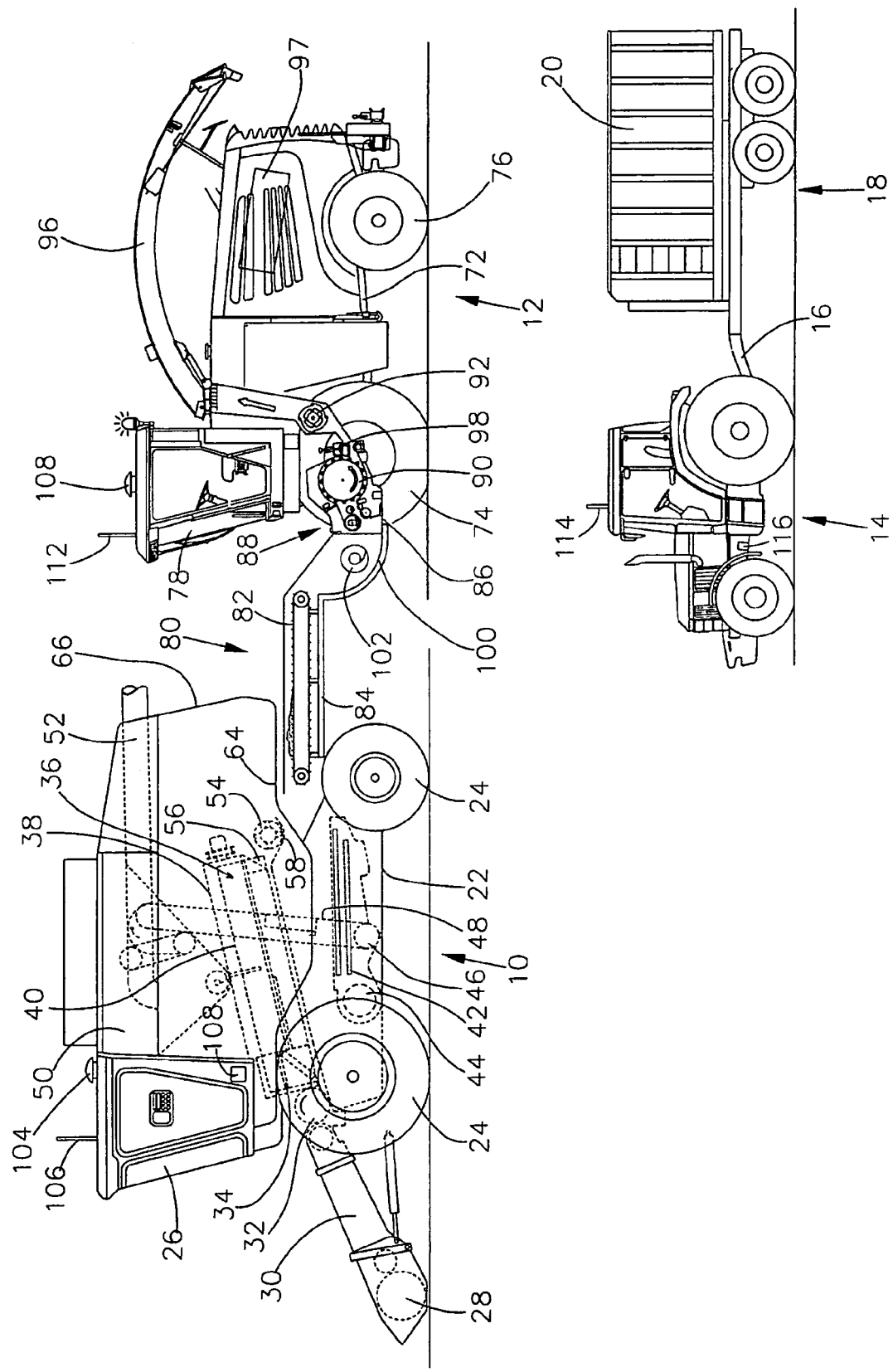

HARVESTING MACHINE COMBINATION FOR THE UTILIZATION OF PLANT REMAINS

FIELD OF THE INVENTION

The invention concerns a harvesting machine combination for the utilization of plant remains. The combination includes a combine with an outlet for plant remains, a transfer arrangement having a chassis, a conveyor for the takeover of the harvested crop remains from the outlet of the combine, a discharge arrangement for the harvested crop remains and a motor to drive the conveyor, and a container to take up the harvested crop remains delivered by the discharge arrangement.

BACKGROUND OF THE INVENTION

During harvesting of cereal crops, corn or other kernel-producing plants by means of a combine, further plant materials are produced in addition to the clean crop, such as chaff and straw. These plant components, characterized herein as plant remains are, as a rule, deposited on the ground in the state of the art in order to take them up subsequently with a baler or a forage harvester (DE 1 096 667 A) or they are chopped by means of a straw chopper and distributed across the field. In order to be able to utilize the harvested crop remains for other purposes, for example, as animal bedding, feed, or blocking material, or for purposes of energy production, it has been proposed that the harvested crop remains be blown out of the combine, by means of a blower fastened to the frame of the combine and connected to a drive of a motor of the combine and to deposit it on a trailer that is pulled behind the combine (U.S. Pat. No. 3,669,123 A and SU 376 054 A).

Moreover it has been proposed (U.S. Pat. No. 3,317,064 A, U.S. Pat. No. 3,952,889 A, U.S. Pat. No. 5,941,768 A and AU 699 834 B) that a separate chassis be coupled to an attachment coupling on which a conveyor is located that would accept harvested crop remains ejected from the combine, a blower, and an internal combustion engine to drive the blower, as well as the conveyor and a storage container be provided. The conveyor conducts the harvested crop remains to the blower which, in turn, deposits them in the storage container.

The deposit of the harvested crop remains on the ground and the subsequent take-up by means of a baler or a forage harvester has the disadvantage that the harvested crop remains can be contaminated by particles on the ground. The blowers attached to the combine avoid this problem (U.S. Pat. No. 3,669,123 A and SU 376 054 A), but require energy from the internal combustion engine of the combine, which is not always available in a sufficient quantity. The chassis that are separately towed behind the combine with internal combustion engines and blowers are not subject to the same disadvantage, but they are rather cumbersome during operation of the combine on public roads, since they must in addition transport the cutter head of the combine, which, as a rule, is drawn along behind the combine on a trailer, which requires a separate tractor and operator. A further disadvantage of the chassis with internal combustion engine and blowers lies in the fact that no means are provided for the reduction of the harvested crop remains, which has shown itself to be particularly disadvantageous if they are to be used to produce bio-energy.

SUMMARY OF THE INVENTION

In view of the foregoing, the purpose underlying the invention is seen in the need to make available a harvesting machine combination appropriate for the utilization of the harvested crop remains, that does not exhibit the aforementioned disadvantages.

A harvesting machine combination appropriate for the utilization of harvested crop remains is composed of a combine, a self propelled forage harvester used as a transfer device for harvested crop remains from the combine to a container and the container. In place of a front harvesting attachment, the forage harvester includes a conveyor to take over the harvested crop remains from the outlet of the combine. The conveyor brings the harvested crop remains ejected from the combine into the intake channel of the forage harvester, which conducts these to a chopper arrangement and a blower, that accelerate the harvest crop remains into a discharge arrangement. The conveyor and the units of the forage harvester are driven by means of the engine of the forage harvester. In order to avoid that the operator has to control the forage harvester so as to follow the combine, the combine is equipped with a transmission arrangement for the transmission of position data, and/or directions of operation and speed of the combine. The forage harvester, for its part, is equipped with a receiver arrangement that interacts with an automatic direction and speed input arrangement, that permits the forage harvester to follow the combine automatically based on data received from the receiver arrangement.

In this way, the harvested crop remains from the combine are chopped to a desired size and deposited in a container. Due to the automatic steering and the speed input from the forage harvester, it follows the combine without any input from the operator, an operation is possible that does not fatigue the operator.

The container for the take up of the harvested crop remains may be located on a trailer that is towed behind the forage harvester or a separate tractor. In the latter case the tractor can be steered automatically by means of a data transmission arrangement from the forage harvester.

BRIEF DESCRIPTION OF THE DRAWINGS

The embodiment(s) of the invention will now be described in further detail with reference to the accompanying drawings wherein:

The single drawing FIGURE shows a side view of a harvesting machine combination for utilization of plant remains, according to the invention, that is composed of a combine, a forage harvester, a tractor and a trailer with a container.

DESCRIPTION OF THE PREFERRED EMBODIMENT

The drawing FIGURE schematically shows a harvesting machine combination for the harvest of kernel type crops that permits the utilization not only of the kernels but also of the plant remains. The harvesting machine combination includes a self propelled combine 10, a self propelled forage harvester 12, a self propelled tractor 14 and a trailer 18 that includes a container 20 and is towed by the tractor 14 by means of a tow bar 16.

The self-propelled combine 10 includes a chassis 22 with wheels 24 in engagement with the ground that are fastened to the chassis 22 and are used for the propulsion of the combine 10 in a forward operating direction, that shown in the drawing FIGURE towards the left. The operation of the combine 10 is controlled from an operator's cab 26. A cutter head 28, that can be replaced during the harvest of corn by a corn picker, is used to harvest crop containing corn and to conduct it to a slope conveyor 30. The harvested crop is conducted by the slope conveyor 30 to a guide drum 32. The guide drum 32 conducts the harvested crop through an inlet transition section 34 to an axial harvested crop processing arrangement 36. In the following description the indications of direction, such as front and rear, refer to the forward operating direction of the combine 10.

The harvested crop processing arrangement 36 includes a rotor housing 38 and a rotor 40 arranged within it. The rotor 40 includes a hollow drum, to which crop processing elements are fastened for a charging section, a threshing section and a separating section. The charging section is arranged on the forward side of the harvested crop processing arrangement 36. The threshing section and the separating section are located in the longitudinal direction downstream and to the rear of the charging section. In place of an axial harvested crop processing arrangement 36 a tangential threshing drum followed by an axial threshing arrangement or straw shakers could be used instead.

Corn and chaff that fall through a thresher basket associated with the threshing section, and a separating grate associated with a separating section are conducted to a cleaning system 42 with a blower 44 and disk shaped sieves that can be brought into an oscillating movement. The cleaning system 42 removes the chaff and conducts the clean corn to a clean corn elevator 48 over a screw conveyor 46. The elevator for clean corn 48 deposits the clean corn in a corn tank 50. The clean corn in the corn tank 50 can be unloaded by an unloading screw conveyor 52 to a corn wagon, a trailer or a truck. Harvested crop remaining at the rear end of the lower disk shaped sieve is again returned to the harvested crop processing arrangement 36 by means of a screw conveyor and an overshot conveyor (not shown). The harvested crop remains that are delivered at the rear end of the upper disk shaped sieve that consist generally of chaff and small straw particles are distributed across the field by chaff distributors (not shown) and are conducted to an ejection drum 54 by means of an oscillating floor conveyor or any other desired conveyor (not shown).

Harvested crop remains (straw) that have been threshed out and are leaving the separating section 36 are ejected through an outlet 56 from the harvested crop processing unit 36 and conducted to the ejection drum 54. The ejection drum 54 that interacts with a floor 62 arranged underneath it, ejects the harvested crop remains to the rear through a lower outlet 64 of a lower outlet hood 66 of the combine 10.

The self-propelled forage harvester 12 is supported on a frame 72 that is carried on driven front wheels 74 and steerable rear wheels 76. The forage harvester 12 is controlled from an operator's cab 78 from which a conveyor 80 can be controlled visually, this conveyor includes a conveyor belt 82 which is carried by a frame 84 and is fastened to the front of the forage harvester 12 and in place of a front harvesting attachment it is attached to the intake channel 86. Harvested crop remains ejected from the outlet 64 of the combine 10 are conducted to the chopper drum 90 by means of the conveyor 80 over an intake conveyor 88 arranged in the intake channel 86 with pre-pressing rolls, that chop it into small pieces and deliver it to a blower 92. The harvested crop leaves the forage harvester 12 over an accompanying trailer 18 through a discharge arrangement 96 in the form of a discharge elbow that can be rotated about an approximately vertical axis and adjusted in its inclination. A post chopper reduction arrangement 98 extends between the chopper drum 90 and the blower 92 with two kernel processing rolls that have been brought into a non-operating position, in which they leave an adequately large slot, through which the crop remains can flow smoothly. It would also be conceivable to expand the post chopper reduction arrangement 98 into the harvesting application described here. Between the conveyor belt 82 and the intake conveyor 88, a trough 100 is also arranged with a transverse through conveyor 102 with central delivery paddles or fingers (not shown), that could be replaced by any desired other conveyor or could be omitted (as would be the trough 100), so that the harvested crop remains are conducted directly to the intake conveyor 88 by the conveyor belt 82. The aforementioned units of the forage harvester 12 and the conveyor 80 are driven by an internal combustion engine 97.

The transfer of the harvested crop remains from the combine 10 to the container 20 by means of the forage harvester 12 has the advantage that the harvested crop remains are deposited in the container 20 in a form that has already been chopped.

The tractor 14 and the trailer 18 are of conventional configuration and accordingly do not require any further detailed discussion.

The combine 10 is equipped with an antenna 104 for the reception of satellite signals from the global positioning system (GPS) that are connected to a computer arrangement 108, that is, in turn, coupled to a transmission arrangement 106 based on radio waves. The computer arrangement continuously transmits data regarding the actual position of the combine 10 and/or its speed, that are derived from signals from a sensor interacting with a wheel 24 or derived from a separate ground speed sensor based on radar, and its direction that are derived from a steering arrangement based on steering data of a manual steering arrangement (not shown) that steers the combine automatically along an edge of the harvested crop, or are provided by a magnetic or a gyro compass or an inertia navigation system and transmitted to the transmitting arrangement 106.

The forage harvester 12 is also equipped with an antenna 108 for the reception of satellite signals from the global positioning system (GPS), that is connected with a computer arrangement 110, which, for its part, in turn is coupled to a receiver arrangement 112 based on radio waves, that received signals from the transmission arrangement 106. On the basis of the data from the transmission arrangement 106 to the receiving arrangement 112 the computer arrangement 110 recognizes in which direction and with what speed the combine 10 moves at that particular time and derived from these data and from the position data of the antenna 108, the steering and speed data, that permits the forage harvester 12 to follow the combine 10 in such a way that the conveyor 80 at all times takes over the harvested crop remains. The steering data are utilized by the computer arrangement 110 that is used as automatic steering arrangement in order to provide input for the steering angle of the rear wheels 76. The speed data are used by the computer arrangement 110 which subsequently is used as automatic speed input arrangement to provide as input the speed of the driven front wheels 74 and, if necessary, the rear wheels 76. The computer arrangement 110 may be connected with appropriate feed-back sensors that are used to detect the steering angle and the actual speed. On the basis of the foregoing it is evident that the forage harvester 12 automatically follows the combine 10, even during the turns at the end of the field. With regard to the automatic following of the combine by the forage harvester 12, reference is made in addition to the documents DE 100 64 860 A, DE 100 64 862 A and DE 10 2004 039 460 B whose disclosures are incorporated by reference into the present document.

The tractor 14 can be operated by its operator manually alongside the forage harvester 12, or it receives signals over a receiver arrangement 114 from a transmission arrangement (not shown) of the forage harvester 12, or the receiving arrangement 114 is also used as transmission arrangement, in order to transmit data regarding the position and/or the speed and direction of the forage harvester 12 to the receiver arrangement 114, analogous to the data transmission between the combine 10 and the forage harvester 12. The tractor 14 may then be equipped with a computer arrangement 116 that automatically influences the steering angle of its steerable front wheels and the speed of its driven rear wheels based on the data received, so that the tractor 14 along with the trailer 18 follows the forage harvester 12.

Having described the preferred embodiment, it will become apparent that various modifications can be made without departing from the scope of the invention as defined in the accompanying claims.

The invention claimed is:

1. A harvesting machine combination for the utilization of harvested plant remains including:
   a combine with an outlet for harvested crop remains;
   a container for the take up of the harvested crop remains from the combine;
   a self propelled forage harvester acting as a transfer arrangement and operating between the combine and the container, the self propelled forage harvester having a chassis, a conveyor for the transfer of harvested crop remains from the outlet of the combine, a discharge arrangement for depositing the harvested crop remains in the container;
   wherein the combine is equipped with a transmitting arrangement for the transmission of signals representing one of position data and operating direction and speed data of the combine, and the forage harvester is equipped with a receiver arrangement for the reception of said data signals from the transmitting arrangement that interacts with a steering angle and speed input arrangement of the forage harvester that can be operated on the basis of said data signals received from the receiving arrangement in order to permit the forage harvester to follow the combine automatically; and wherein the container is pulled by a tractor and the tractor is automatically steered to follow the forage harvester based upon signals transmitted from the forage harvester and received by the tractor.

* * * * *